United States Patent [19]

Ohsawa

[11] 3,896,386

[45] July 22, 1975

[54] TUNING INDICATOR WITH NOISE SIGNAL DETECTOR

[75] Inventor: Mitsuo Ohsawa, Kanagawa, Japan

[73] Assignee: Sony Corporation, Tokyo, Japan

[22] Filed: Sept. 18, 1972

[21] Appl. No.: 290,178

[30] Foreign Application Priority Data

Sept. 20, 1971 Japan .......... 46-73245

[52] U.S. Cl. .......... 325/398; 325/455; 179/15 BT; 334/36

[51] Int. Cl. .......... H04b 1/16

[58] Field of Search .......... 325/398, 364, 455; 324/98 N, 98 E, 98 F, 98 Z, 98 J, 81, 103 R; 334/36, 37, 38; 179/15 BT

[56] References Cited

UNITED STATES PATENTS

| | | | |
|---|---|---|---|
| 2,486,890 | 11/1949 | Stanmyre | 324/103 R |
| 3,296,378 | 1/1967 | Fish, Jr. et al. | 179/15 BT |
| 3,319,004 | 5/1967 | Avins | 325/455 |
| 3,480,912 | 11/1969 | Speeth et al. | 340/148 |
| 3,569,633 | 3/1971 | Brahman | 179/15 BT |
| 3,679,979 | 7/1972 | Krepps, Jr. et al. | 325/398 |
| 3,696,301 | 10/1972 | Hoshi | 325/398 |
| 3,717,817 | 2/1973 | Auerbach | 325/455 |

*Primary Examiner*—Robert L. Griffin
*Assistant Examiner*—Aristotelis M. Psitos
*Attorney, Agent, or Firm*—Lewis H. Eslinger; Alvin Sinderbrand

[57] ABSTRACT

A tuning indicator for use with FM radio receivers and including a circuit to select a relatively high frequency noise signal at the output of the FM detector. The noise frequency is high enough to be separated from information signals but low enough so that its amplitude changes as the receiver is tuned in to an FM signal. The amplitude of the selected frequency is measured and is used to operate one or more luminous devices to indicate an approaching or final tuned-in condition. If several luminous devices are used, they may be illuminated additively or alternatively. One of them may indicate an exact tuned-in condition. The indicator may also include luminous means to indicate reception of stereo or mono signals.

4 Claims, 10 Drawing Figures

TUNING INDICATOR WITH NOISE SIGNAL DETECTOR

BACKGROUND OF THE INVENTION

1. Field of the Invention

This invention relates to an improved tuning indicator for frequency-modulation receivers.

2. Prior Art

In order to determine the optimum tuning of a frequency-modulation (FM) receiver heretofore, it has been common to use a tuning meter actuated by a unidirectional signal produced by rectifying the intermediate frequency (IF) signal. However, the IF signals in an FM receiver are passed through a limiter before being applied to the FM detector, and the operation of the limiter makes it impossible to obtain a sharp peak value at the optimum tuning point. To improve the sharpness of indication, it is possible to connect the IF signal also to a separate narrow band pass amplifier and to rectify the output of this amplifier. The tuning meter may then be actuated by the rectified output, but unfortunately the dynamic range of the narrow band pass amplifier cannot be widened. As a result, the rectified output applied to the tuning meter does not exhibit a sharp peak value at the optimum tuning point in the case of a signal exceeding the saturation level of the narrow band pass amplifier.

In addition to the circuit difficulties, it may be difficult to determine the optimum tuning point by observing the tuning meter itself. If, instead of a meter, a tuning eye is used as the indicator, it is even more difficult to determine the optimum tuning point.

Therefore, it is one of the objects of the present invention to provide a simple and effective tuning indicator device.

Another object is to provide an effective tuning indicator device that includes a new noise detecting system.

Another object is to provide an improved tuning device incorporating a plurality of luminous means such as lamps or light-emitting diodes.

Another object is to provide a tuning indicator device incorporating a plurality of luminous means that are made continuously bright in response to the tuning condition so that an untrained person can easily determine the optimum tuning point.

A further object is to provide an improved tuning indicator incorporating a plurality of luminous devices that are successively illuminated in response to the tuning condition.

A still further object of the present invention is to provide an improved tuning indicator device having a protection circuit that prevents improper tuning indication when there is no FM signal present.

A still further object of the present invention is to provide an improved tuning indicator device and stereo-mono indicator device.

Still further objects will become apparent from the following specification together with the drawings.

BRIEF STATEMENT OF THE INVENTION

In accordance with the present invention, a selecting circuit, such as a tuned amplifier, is connected to the output of the FM detector of a receiver. The circuit is tuned to a frequency above the information frequencies of the FM signal. For example, it may be tuned to 80khz. The output of this circuit is rectified, and the rectified signal is connected to a transistor that is normally non-conductive and has a luminous device, such as an incandescent light or a light-emitting diode or the like, as its load. As the receiver is tuned across the FM frequency band and approaches an incoming signal, the output of the noise selecting circuit increases to the point at which the rectified signal reaches an amplitude that makes the transistor conductive and switches on the luminous device. In this way, the person using the receiver will know that it is being tuned in to an FM signal.

The strength of the signal received by the selecting circuit increases as the receiver is tuned closer to the incoming FM signal. Thus it is possible to connect several rectifying circuits and transistors with their associated luminous devices to the output of the selecting circuit. The bias on the individual transistors is preferably adjusted so that they become conductive one after another to cause the illuminating devices to light up in sequence as the tuning approaches closer and closer to the value of the incoming signal.

When the receiver is tuned to the exact frequency of the incoming signal, the selected noise signal drops sharply to a low value, which causes all of the illuminating devices to be extinguished. This is one way of indicating that the correct tuning location has been reached. An additional indication may be obtained from an additional illuminating device connected to receive a rectified IF signal from the receiver. The additional illuminating device is connected to be controlled by an additional transistor circuit which is conductive only when an incoming signal of sufficient amplitude reaches it. Thus the additional illuminating device will be turned on only if the receiver is properly tuned to an incoming signal. However, it is possible that the additional illuminating device would be energized by a high level noise signal and in order to prevent this from happening, the transistor that controls the additional illuminating device may itself be controlled by a gate connected to the transistors that control the other illuminating devices. This gate will be opened so as to allow signals to pass through to the transistor that controls the additional illuminating device only when the illuminating devices that indicate an approach to a tuned-in condition have all been extinguished by virtue of the low noise signal level that exists at the tuned-in condition.

Additional illuminating means may be connected to a section of the FM receiver that is operative in response to stereo signals. The additional illuminating means would then indicate whether the incoming signal was a stereo or a mono signal.

DETAILED DESCRIPTION OF THE INVENTION

Figure 1A:
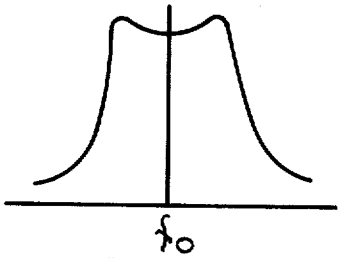
FIGS. 1A–1C illustrate frequency response characteristics associated with the operation of the invention.
Figure 1B:
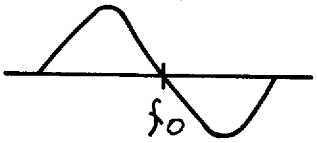
Figure 1C:
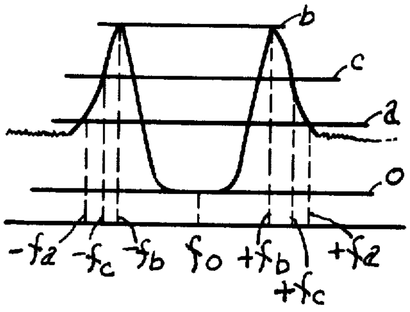

FIG. 1A shows a typical frequency response characteristic of an FM signal. For the purpose of description of the invention it will be assumed that the frequency $f_o$ is the center of the IF frequency response of an FM receiver. FIG. 1B shows the typical S curve of an FM detector for detecting the signal in the band pass range of FIG. 1A. FIG. 1C shows the signal characteristic contained in the demodulated signal at the output of the detector. This signal contains pure signal components distributed around the bottom of the central valley and noise components distributed at a greater frequency spacing from the center frequency. These frequency values are indicated as $+f_2$ and $-f_a$, $+f_b$ and $-f_b$, and $+f_c$ and $-f_c$. These are not fixed frequencies but are those frequencies that correspond to noise signal levels of $a$, $b$, and $c$, respectively. The noise signal level at the center of the valley is indicated by $o$.

Figure 2:
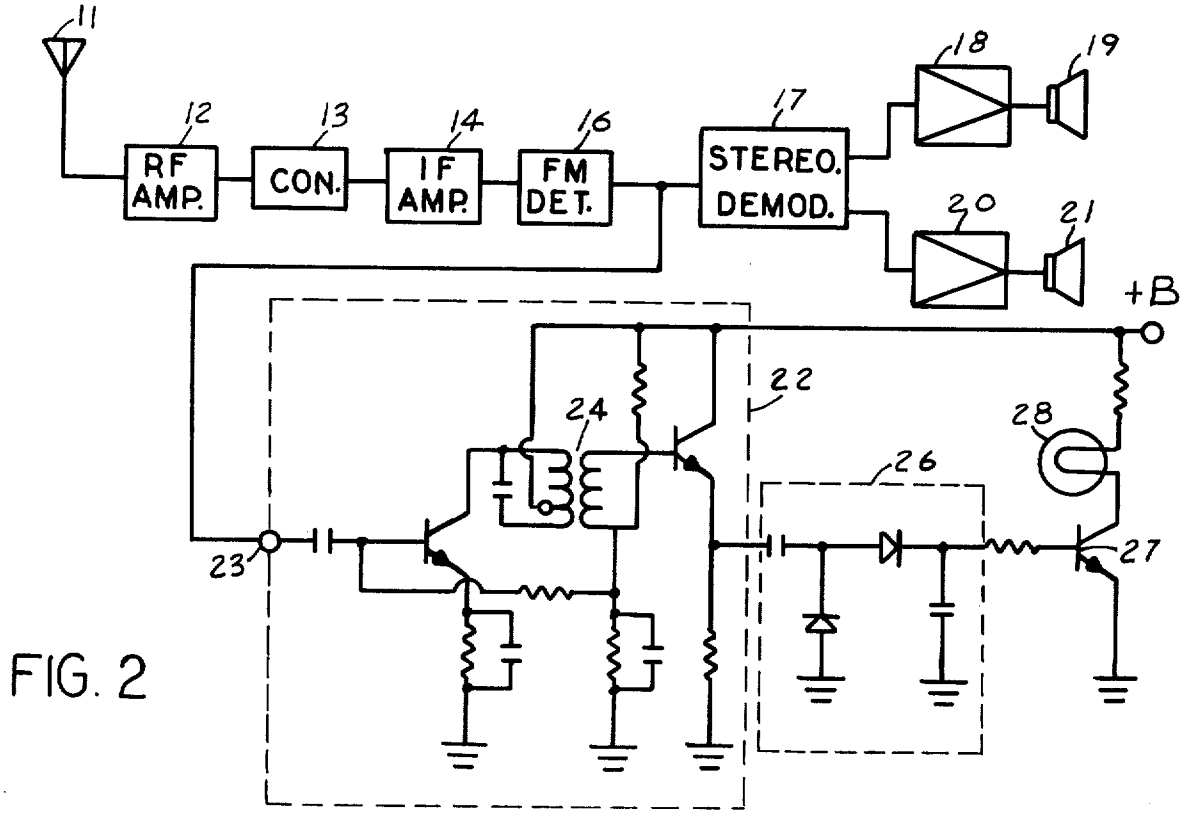
FIG. 2 is a diagram of an FM receiver shown mostly in block form and incorporating the indicator of the present invention.

FIG. 2 shows a typical FM receiver block diagram to which a basic circuit according to the present invention has been added. The receiver comprises an antenna 11, an RF amplifier 12, a converter 13, an IF amplifier 14, and an FM detector 16. The output of the FM detector 16 is connected to a stereo demodulator 17, one output of which is connected to a power amplifier 18 that feeds a signal to a speaker 19. The other output of the stereo demodulator 17 is connected to another power amplifier 20 that feeds a speaker 21.

The output of the FM detector 16 is also connected to a noise selecting circuit, or noise detector, 22 by way of an input terminal 23. The noise detector circuit 22 includes a tuned amplifier having a circuit 24 tuned to a suitable frequency such as 80Khz. The output of the noise detector 22 is connected to a voltage doubler rectifier circuit 26 which, in turn, is connected to the input of a transistor 27. An illuminating device 28, which may be an incandescent lamp or a light-emitting diode or any other suitable illuminating device, is connected to the collector of the transistor 27 to act as the load for the transistor.

The operation of the circuit in FIG. 2 is standard insofar as the FM receiver shown in the blocks is concerned. The band pass characteristic of the IF amplifier 14 is typically of the sort illustrated in FIG. 1A. The transfer characteristic of the FM detector 16 is typically of the form shown in FIG. 1B. The characteristic of the output signal of the FM detector 16 is illustrated in FIG. 1C and is applied by way of the terminal 23 to the noise detector circuit 22. As may be seen, the voltage level of this signal is below the level $a$ at frequencies remote from the band of the FM signal. This noise signal is amplified in the noise detector circuit 22 and rectified in the circuit 26 and applied to the transistor 27. However, the transistor 27 is biased so that it does not become conductive until a sufficiently high signal level is applied to it. This bias may be such that, as the signal applied to the terminal 23 reaches the level $a$, the transistor 27 becomes conductive and causes the illuminating device 28 to give off illumination. Alternatively, the bias of the transistor 27 may be set such that it will not become conductive until the signal applied to the terminal 23 reaches the level $c$ or the level $b$. In any case, when the illuminating device 28 is turned on, it indicates that the tuning of the RF amplifier 12 in the receiver is getting close to a tuned-in condition on an incoming FM signal.

Figure 3:
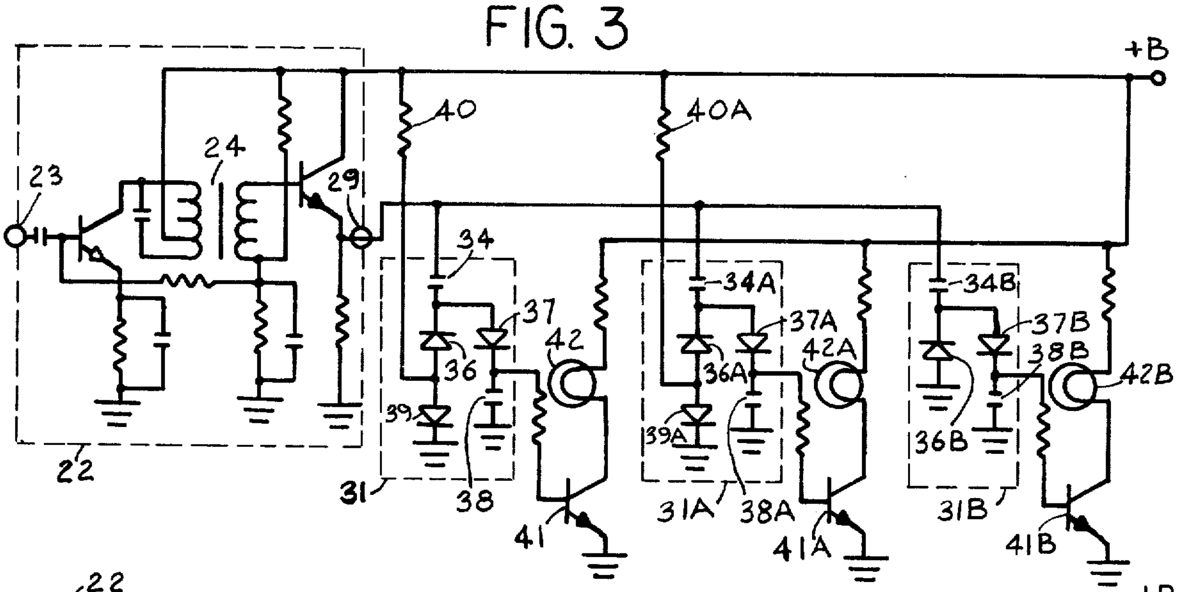
FIG. 3 is a schematic device of an indicator device according to the invention and adapted for use in the circuit in FIG. 2.

The circuit in FIG. 3 contains a number of components similar to those in FIG. 2, including particularly the noise detector circuit 22. In FIG. 3 the output of the noise detector circuit 22 is derived from a terminal 29 and is connected to three voltage doubler rectifier circuits 31–31B. The voltage doubler rectifier circuit 31 includes a capacitor 34, a diode 36, a second diode 37 and a second capacitor 38. In addition, another diode 39 and a resistor 40 are connected in series across the +B voltage supply to provide the proper bias voltage for a transistor 41. The transistor 41 has an illuminating device 42 connected in series with its collector as the load for the transistor.

The voltage doubler circuit 31A is virtually identical with the circuit 31 and another biasing circuit comprising a diode 39A and a resistor 40A are connected to the voltage doubler circuit 31A to provide proper bias for a transistor 41A that controls the operation of an illuminating device 42A.

The third voltage doubler circuit 31B is virtually identical with the voltage doubler circuit 31 and is connected to a transistor 41B, but there is no diode and biasing resistor similar to the diode 39 and the resistor 40. The transistor 41B is connected in series with a third illuminating device 42B.

In operation of the circuit of FIG. 3, the bias established by the diode 39 and the resistor 40 for the transistor 41 is such that the transistor 41 conducts as soon as the voltage level applied to the input terminal 23 reaches the level $a$ shown in FIG. 1C. The bias level established by the diode 39A and the resistor 40A in FIG. 3 is such that the transistor 41A becomes conductive as soon as the voltage level applied to the terminal 23 reaches the level $c$ in FIG. 1C. The transistor 41B is controlled only by the output of the voltage doubler circuit 31B and has no assisting bias. Therefore the transistor 41B becomes conductive only when the voltage level at the input terminal 23 reaches the level $b$ shown in FIG. 1C.

Since the transistors 41 and 41A remain conductive as long as the output voltages of the respective voltage doubler circuits 31 and 31A exceed the necessary levels, the illuminating device 42 remains on after the illuminating device 42A has been turned on, and both of the illuminating devices 42 and 42A remain on after the illuminating device 42B has been turned on. Thus the approach to a tuned-in condition is indicated by the fact that the first illuminating device 42 begins to give off light and then the illuminating device 42A and then the illuminating device 42B. When the receiver is completely tuned-in, all three of the illuminating devices 42–42B are extinguished because the available signal level is too low to cause the transistors 41–41B to remain conductive.

Figure 4:
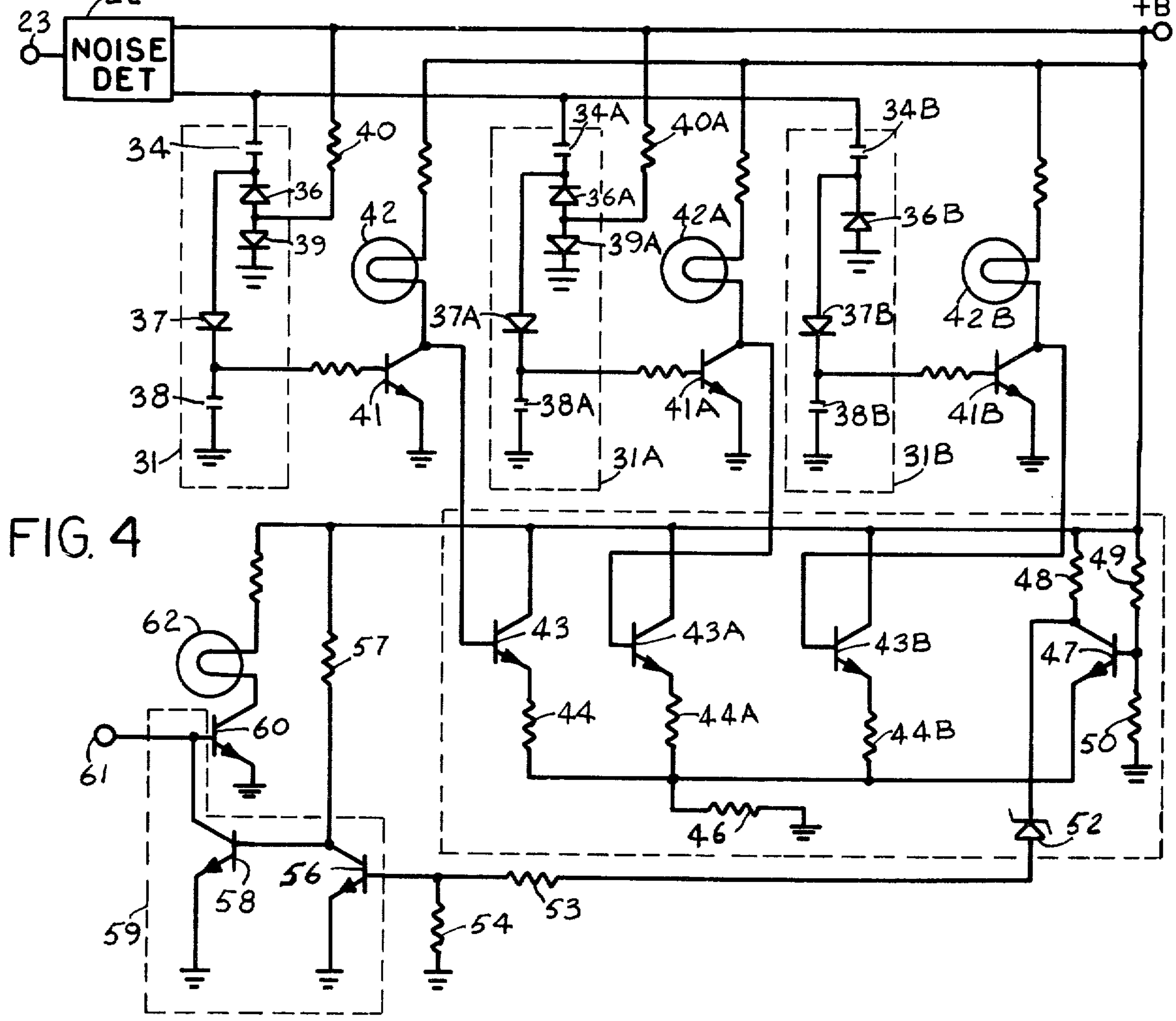
FIG. 4 is a schematic diagram of an improved tuning indicator according to the present invention.

FIG. 4 shows a circuit that is an improvement over the circuit in FIG. 3 that contains a number of the same components. These components are identified by the same reference numerals. The components shown for the first time in FIG. 4 include three transistors 43–43B, each of which has a resistor 44–44B connected in its emitter circuit. The collectors of the three transistors 43–43B are connected directly to the +B power supply terminal, and a resistor 46 is connected between the common junction of all of the resistors 44–44B and ground.

The emitter-collector circuit of a transistor 47 in series with a collector load 48 in parallel with the resistors 43–43A and their respective emitter loads, 44–44B. The bias on the base of the transistor 47 is determined by a voltage divider comprising a pair of resistors 49 and 50 connected across the power supply terminals between +B and ground and having a mid-point connected to the base of the transistor 47. The bases of the three transistors 43–43B are connected, respectively, to the collectors of the transistors 41–41B to be controlled thereby.

A zener diode 52 is connected from the collector of the transistor 47 to a voltage divider comprising a pair of resistors 53 and 54. The mid-point of this latter voltage divider is connected to the base of a transistor 56 which has an emitter connected to ground and a collector connected through a load resistor 57 to the +B supply terminal. The collector of the transistor 56 is also connected to the base of a transistor 58 which has a grounded emitter and a collector connected to the base of another transistor 60. The transistors 56 and 58 comprise a gate circuit 59 connected to the base of the transistor 60. The base of the transistor 60 is also connected to an input terminal 61 that receives rectified voltage from the IF circuit 14 of FIG. 2. The emitter of the transistor 60 is connected to ground and the collector is connected through an illuminating device 62 to the +B power supply terminal.

In operation, the bias on the base of the transistor 47 is such that that transistor will be conductive unless all three of the transistors 43–43B are conductive and supply enough current through their respective emitter loads 44–44B and the resistor 46 to raise the voltage level at the emitter of the transistor 47 to a high enough voltage to make that transistor non-conductive. This cut-off level is set so that if any one of the transistors 43–43B is not conductive, the voltage level across the resistor 46 will not be high enough to prevent the transistor 47 from becoming conductive. In effect, this defines an OR circuit.

When the transistor 47 is non-conductive, the voltage supplied via the diode 52 and the resistors 53 and 54 to the base of the transistor 56 is such that the transistor 56 will be conductive. This causes the voltage at the collector of the transistor 56 to drop to a low level and makes the transistor 58 non-conductive. On the other hand, when the transistor 47 is conductive, the voltage at its collector is at a reduced level such that the transistor 56 becomes non-conductive. This allows the voltage at the collector of the transistor 56 to rise high enough so that the transistor 58 becomes conductive. Thus the transistor 58 effectively short-circuits the base of the transistor 60 to ground when the transistor 47 is conductive but does not load down the base when the transistor 47 is non-conductive.

The transistors 41–41B operate in the circuit of FIG. 4 in a manner similar to their operation in the circuit in FIG. 3. These transistors become conductive one after the other as the FM receiver to which this circuit is attached comes closer and closer to the tuned-in condition. When the tuning is far removed from the proper frequency, none of the transistors 41–41B is conductive and therefore the voltage at their respective collectors is at a relatively high level which causes the three transistors 43–43B to be conductive. As stated previously, the combined current flowing through these transistors is sufficient to produce a voltage drop across the resistor 46 that causes the transistors 47 to be non-conductive. However, as soon as the tuning becomes close enough to allow the first transistor 41 to become conductive, the voltage at its collector drops and causes the transistor 43 to become non-conductive. This reduces the voltage drop across the resistor 46 enough for the transistor 47 to become conductive. As a result the transistor 56 becomes non-conductive and the transistor 58 becomes conductive, which prevents the transistor 60 from being actuated by a large noise signal and thereby causing the illuminating device 62 to be turned on.

Figures 5, 6, 7:
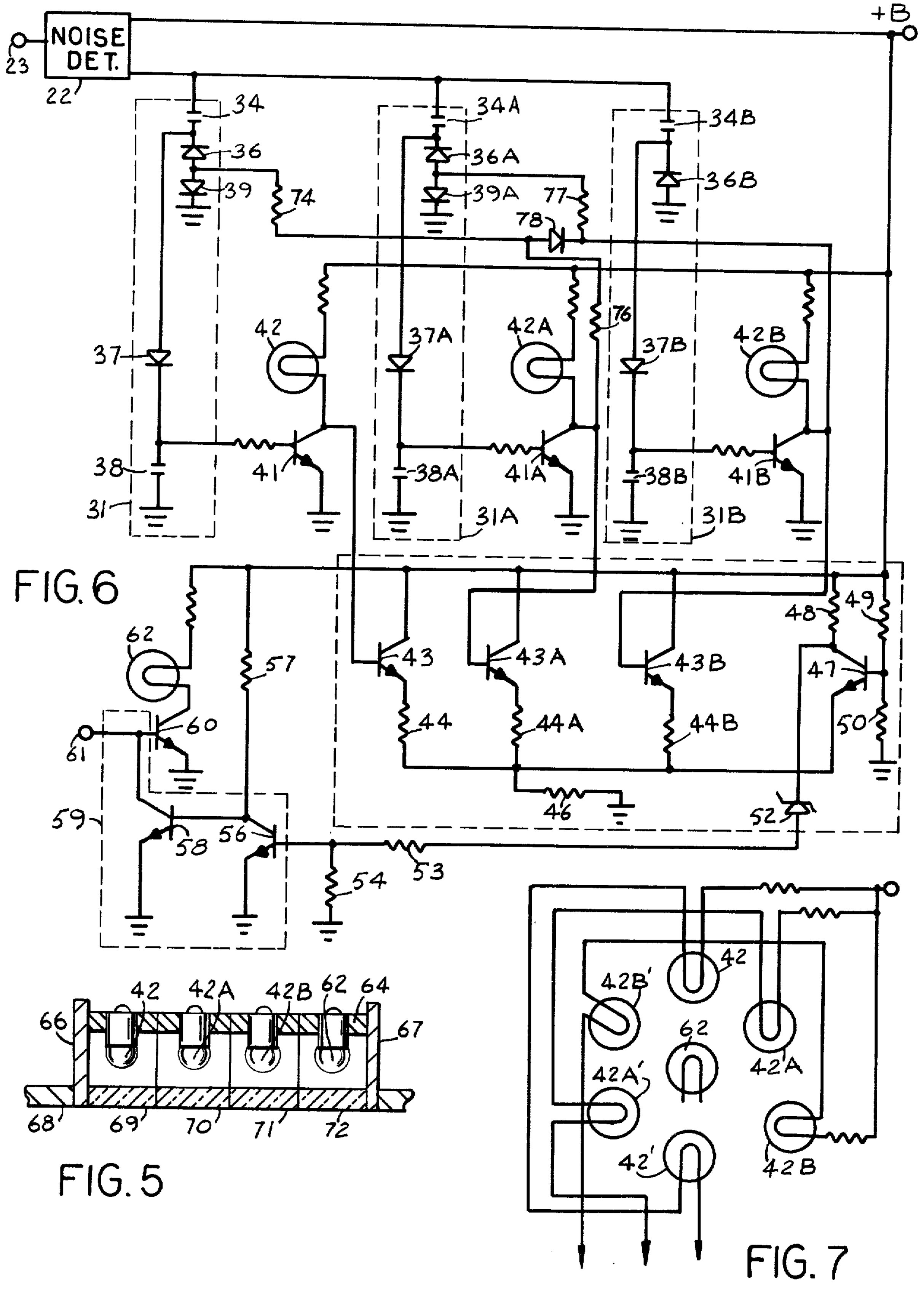
FIG. 5 is a cross-sectional view of an indicator assembly for use in a receiver.
FIG. 6 is another embodiment of an indicator circuit according to the present invention.
FIG. 7 is a schematic diagram of an indicator lamp circuit for use with the circuit in FIG. 6.

FIG. 5 is a cross-sectional view of a fragment of an FM receiver cabinet showing one arrangement of the illuminating devices 42–42B and 62 of FIG. 4. These illuminating devices are illustrated as incandescent light bulbs supported on a base 64 carried by two brackets 66 and 67 behind the front panel 68 of the receiver. In front of the incandescent bulbs 42–42B and 62 are light transparent windows 69–72 which are preferably made of material having different color characteristics. For example, the window 69 may transmit white light, the window 70 may transmit yellow light, the window 71 may transmit orange light and the window 72 may transmit red light. Thus, not only will there be a change in the amount of illumination as the receiver is tuned in to an incoming signal, but the illumination will take on an increasingly red hue as the tuning gets closer to the proper point and will finally become entirely red as the incandescent bulbs 42–42B are turned off and only the incandescent bulb 62 remains on when the receiver is completely tuned in.

The circuits in FIGS. 3 and 4 operate in such a manner that when the illuminating device 42B is turned on, the illuminating devices 42 and 42A will remain on. FIG. 6 shows a circuit in which only one illuminating device at a time is turned on. Most of the circuit in FIG. 6 is similar to that in FIG. 4 and is identified by similar reference numerals. However, in FIG. 6 the bias voltage for the transistor 41 is not supplied directly from the +B power supply line. Instead the common junction between the diodes 36 and 39 is connected by way of a resistor 74 and another resistor 76 to the collector of the transistor 41A. This collector in turn is connected to the +B power supply line through the illuminating device 42A, and if necessary, a series resistor.

Similarly the bias for the transistor 41A is not obtained directly from the +B power supply line. Instead the common junction between the diodes 36A and 39A is connected by way of a resistor 77 to the collector of the transistor 41B. A diode 78 is connected from the common junction between the resistors 74 and 76 to the common junction between the resistor 77 and the collector of the transistor 41B.

In operation of the circuit in FIG. 6, as the receiver is tuned toward the part of the frequency band in which an incoming FM signal is located, the amplitude of the signal applied to the input terminal 23 of the noise detector 22 will eventually reach the level *a* and the transistor 41 will become conductive, thereby causing the illuminating device 42 to be turned on. As the tuning continues toward the proper frequency, the voltage applied to the input terminal 23 will reach the level that causes the transistor 41A to become conductive. However, when this happens the voltage at the collector of the transistor 41A drops to a low level, which drops the bias on the transistor 41 to a point below which that transistor can continue to conduct. As a result the illuminating device 42 will be extinguished at the time that the illuminating device 42A is turned on.

As the receiver is tuned still closer to the proper frequency the voltage level applied to the terminal 23 will be sufficient to cause the transistor 41B to become conductive. When this happens the voltage at the collector of the transistor 41B drops to a low level, causing the bias on the transistor 41A to drop below the level of conductivity. When the transistor 41A becomes nonconductive, the voltage at its collector rises, and this would cause the bias applied to the transistor 41 to return to a level such that that transistor might also become conductive and cause the illuminating device 42 to be turned back on. However, the diode 78 clamps the voltage at the junction between the resistors 74 and 76 to a level that cannot greatly exceed the voltage level at the collector of the transistor 41B, and this is too low to allow the transistor 41 to resume conductivity. Thus, the illuminating devices 42–42B are turned on one at a time in sequence.

FIG. 7 shows another arrangement for the illuminating devices, particularly for use in conjunction with the circuit in FIG. 6. In this structure the illuminating devices 42–42B are arranged on a circular arc and are connected, respectively, to matching illuminating devices 42'–42B' diametrically across the center of the arc. The illuminating device 62 is located in the center of the circle. The pairs of illuminating devices that are diametrically opposite each other are connected in series so that they will be illuminated simultaneously. Thus, as the receiver is brought closer to a tuned-in condition, and the illuminating devices 42–42B and 42'–42B' are turned on, the illumination will appear to travel in a circle and will finally come to the center when the receiver is properly adjusted and only the illuminating device 62 is giving off light.

Figure 8:
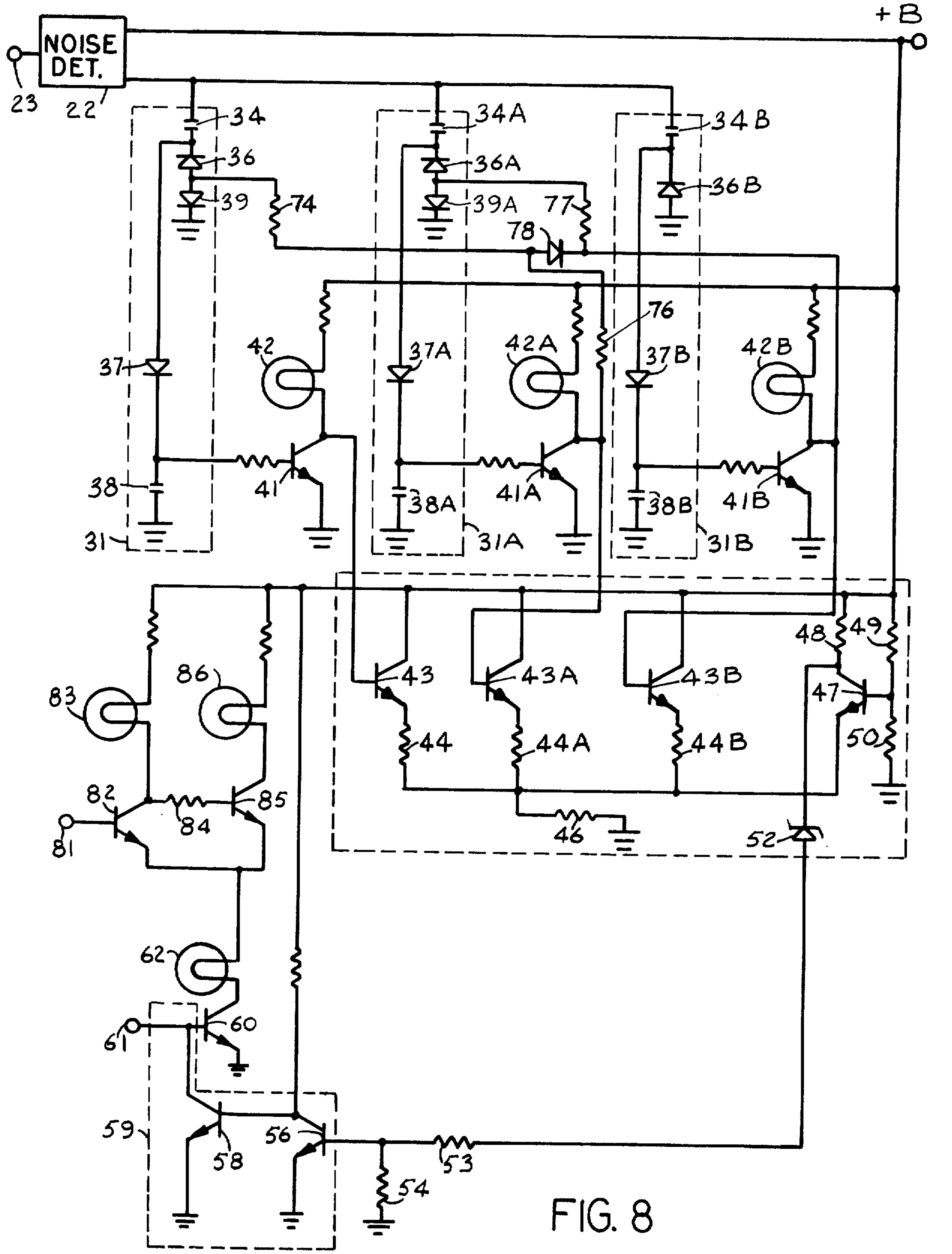
FIG. 8 is a schematic diagram of still another embodiment of an indicator circuit according to the present invention.

FIG. 8 includes means for identifying, by means of illuminating devices, whether the incoming signal is a stereo or a mono signal. Most of the circuit in FIG. 8 is similar to that in FIG. 6 and is identified by similar reference numerals.

The section of the circuit for identifying stereo and mono signals includes an input terminal 81 to be connected to a source of signal in the FM receiver that is responsive to reception of stereo signals. Such a source may be the stereo-demodulator 17 shown in FIG. 2. The input terminal 81 is connected to the base of a transistor 82, the collector of which is connected by way of an illuminating device 83 to the +B power supply terminal. The emitter of the transistor 82 is connected to one terminal of the illuminating device 62 which, in turn, is connected by way of the emitter-collector circuit of the transistor 60 to ground.

The collector of the transistor 82 is also connected by way of a resistor 84 to the base of another transistor 85. The collector of the transistor 85 is connected to an illuminating device 86 which, in turn, is connected to the +B power supply terminal. The emitter of the transistor 85 is connected to the common connection between the emitter of the transistor 82 and one terminal of the illuminating device 62.

In operation, the illuminating devices 42–42B are turned on in sequence, as they are in the circuit in FIG. 6. When the receiver is tuned to the proper frequency, the illuminating device 62 is turned on after the last of the illuminating devices 42–42B has been turned off by operation of the circuit. Illuminating device 62 draws current through either the transistor 82 or the transistor 85, depending on which of these two transistors is conductive.

The conductivity of the transistor 82 depends upon the reception of a signal at the terminal 81, indicating that a stereo signal is being received by the receiver. When the transistor 82 becomes conductive, the illuminating device 83 is turned on. Due to the fact that the resistor 84 is connected to the collector of the transistor 82, the voltage applied to the base of the transistor 85 is not sufficient to cause that transistor to become conductive and thus, the illuminating device 86 is not turned on. As long as the receiver receives a stereo signal, the illuminating device 83 remains on and the illuminating device 62 also remains on and draws current through the transistor 82.

If the receiver is tuned to a channel that is not receiving a stereo signal but is receiving only a mono signal, there will be no output from the stereo-demodulator 17 in FIG. 2 to be applied to the input terminal 81. As a result the transistor 82 will not be conductive and the illuminating device 83 will not be turned on. However, in this condition the voltage applied to the base of the transistor 85 is sufficient to cause that transistor to become conductive and to turn on the illuminating device 86. The current through the transistor 85 also supplies the illuminating device 62. As a result the illuminating device 62 remains on along with either the illuminating device 83 or the illuminating device 86.

What is claimed is:

1. A tuning indicator for use with an FM radio receiver comprising an IF circuit and an FM detector, said indicator comprising:

A. a noise signal selector coupled to said FM detector to receive signals therefrom and tuned to a predetermined frequency outside of the band of signal frequencies from said detector to extract a noise signal of said predetermined frequency;

B. a plurality of illuminating devices;

C. a plurality of level detecting circuits connected to said noise signal selector to be energized by said noise signal, each of said level detecting circuits having a different response level and comprising an individual switching means connected to a corresponding one of said illuminating devices whereby each of said illuminating devices will be actuated at a predetermined level of said noise signal corresponding to the relationship between the frequency to which said receiver is tuned and an incoming signal;

D. additional visual indicating means;

E. actuating means connected to said IF circuit, said actuating means being responsive to an IF signal corresponding to a received FM signal and being connected to said additional visual indicating means to thereby energize said additional indicating means in response to reception of said FM signal; and F. gate means connected to said level detecting circuits to control the operation of said actuating means to permit the latter to energize said additional indicating means only when said receiver is in a tuned-in condition with respect to said FM signal.

2. The tuning indicator of claim 1 in which said gate means comprises a plurality of inputs, each connected to a respective one of said switching means to be actuated thereby, and an output circuit connected to said additional actuating means to control the operation thereof.

3. The tuning indicator of claim 2 in which said gate means comprises:

A. an OR gate, comprising a separate input circuit connected to each of said switching means whereby said OR gate prevents said additional actuating means from energizing said additional indicating means when any one of said switching means is actuated.

4. A tuning indicator for use with an FM radio receiver comprising an FM detector and a generating circuit for generating a stereo-indicating signal in response to reception of a stereo FM signal by said receiver, said indicator comprising:

A. a noise signal selector coupled to said FM detector to receive signals therefrom and tuned to a predetermined frequency outside of the band of signal frequencies from said detector to extract a noise signal of said predetermined frequency;

B. a plurality of illuminating devices;

C. a plurality of level detecting circuits connected to said noise signal selector to be energized by said noise signal, each of said level detecting circuits having a different response level and comprising an individual switching means connected to a corresponding one of said illuminating devices whereby each of said illuminating devices will be actuated at a predetermined level of said noise signal corresponding to the relationship between the frequency to which said receiver is tuned and an incoming signal;

D. a stereo-indicating illuminating device;

E. a first transistor comprising an output circuit connected in series with said stereo-indicating illuminating device and an input circuit connected to said generating circuit to be energized by said stereo-indicating signal so that current flows through said stereo-indicating illuminating device;

F. a mono-indicating illuminating device;

G. a second transistor comprising an output circuit connected in series with said mono-indicating illuminating device and an input circuit connected to said output circuit of said first transistor, whereby said second transistor is conductive when said first transistor is non-conductive so that current flows through said mono-indicating illuminating device;

H. additional visual indicating means;

I. actuating means connected in series with said additional indicating means and in series with both of said output circuits of said first and second transistors for enabling current to flow through said first or second transistor when actuated, whereby said additional indicating means is energized by current flowing through either of said first or second transistors; and J. gating means connected to said level detecting circuits to be energized thereby and connected to said actuating means to control the operation thereof to allow said additional indicating means and said stereo-indicating and mono-indicating devices to be actuated only when said receiver is tuned in to an FM signal and said level detecting circuits are thereby turned off.

* * * * *